July 14, 1942.　　G. F. SHEPPARD　　2,290,076
TRANSMISSION MECHANISM
Filed March 29, 1940　　4 Sheets-Sheet 2

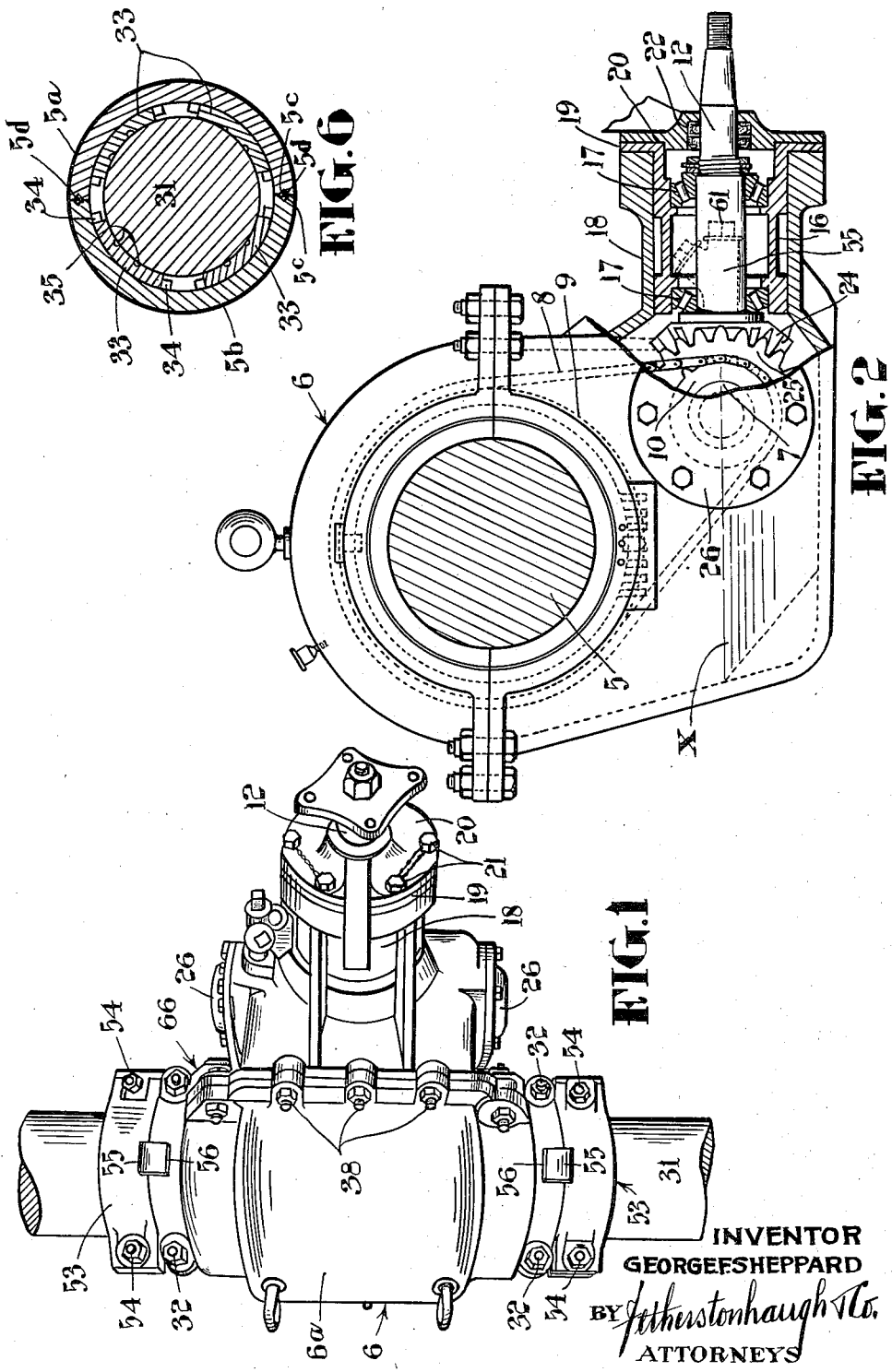

INVENTOR
GEORGE F. SHEPPARD
BY *Fetherstonhaugh & Co.*
ATTORNEYS

July 14, 1942.  G. F. SHEPPARD  2,290,076
TRANSMISSION MECHANISM
Filed March 29, 1940  4 Sheets-Sheet 3

INVENTOR
GEORGE. F. SHEPPARD
BY Fetherstonhaugh &Co.
ATTORNEYS

INVENTOR
GEORGE. F. SHEPPARD
BY *Fetherstonhaugh & Co.*
ATTORNEYS

Patented July 14, 1942

2,290,076

UNITED STATES PATENT OFFICE 2,290,076

TRANSMISSION MECHANISM

George F. Sheppard, Montreal, Quebec, Canada

Application March 29, 1940, Serial No. 326,716

6 Claims. (Cl. 184—11)

This invention relates to transmission mechanisms for driving a generator from one of the truck axles of a railway car and the principal object is to provide a generally improved transmission assembly of the type disclosed in U. S. Patent No. 2,084,259, granted June 15, 1937.

Generally speaking, the transmission assembly disclosed in said patent comprises a split axle-driven sleeve clamped to the driving axle in metal to metal contact therewith, a transmission casing rotatably mounted on said sleeve, a jack shaft journalled in said casing, drive chains connecting chain sprockets on the sleeve with similar sprockets on the jack shaft and gearing connecting the jack shaft with a generator driving tail shaft extending into said casing.

In the improved assembly provided by the present invention rubber load distributing blocks are interposed between the axle and the axle driven sleeve and are placed under heavy compression when the two parts of the sleeve are secured together by the clamping bolts provided for this purpose. This construction eliminates the accurate machining of the inner surface of the sleeve and the accurate fitting of the sleeve to the axle which is necessary when the sleeve and axle are in metal to metal contact as provided for in said patent.

According to another feature of the invention the axle engaging surfaces of the rubber blocks interposed between the axle and the sleeve are grooved to ensure a more uniform distribution of the pressure which is exerted on the axle through the agency of the rubber blocks when the two parts of the sleeve are drawn tightly together by the clamping bolts.

Another feature of the invention resides in the provision of means for securing the rubber blocks to the sleeve so that said blocks are uniformly spaced about the axle when the sleeve is secured in place. To this end the rubber blocks are force fitted in confining pockets afforded by longitudinally and circumferentially extending ribs formed on the inner surface of the sleeve.

Another feature of the invention resides in the provision of driving collars clamped to the axle at opposite ends of the axle driven sleeve, each collar being provided with driving dogs fitted in notches formed in said sleeve. This construction provides a direct drive connection between the axle and each end of the sleeve and prevents objectional stressing of the rubber blocks interposed between the axle and the sleeve. It also holds the sleeve against axial displacement in either direction should the rubber blocks fatigue due to pressure or be softened by contact with oil from an outside source.

A further feature of the invention resides in the provision of an improved bearing construction for rotatably mounting the transmission casing on the axle driven sleeve.

A still further feature of the invention resides in the provision of improved means for lubricating the bearing surfaces by which the transmission casing is rotatably mounted on said sleeve, said means including lubricant collecting grooves in which the lubricant supplied to the bearing surfaces of the casing and sleeve is collected after traversing said surfaces and is returned to the bottom of the casing in such manner as to avoid loss of lubricant through leakage between the casing and the casing supporting ends of the sleeve.

Proceeding now to a more detailed description reference will be had to the accompanying drawings, in which—

Fig. 1 is a perspective view of the complete transmission assembly provided in accordance with my invention.

Fig. 2 is a side view of the assembly shown in Fig. 1.

Fig. 6 is a sectional view of a part of the axle and the axle driven sleeve and shows the manner in which the rubber blocks are interposed between these elements.

Figure 3:
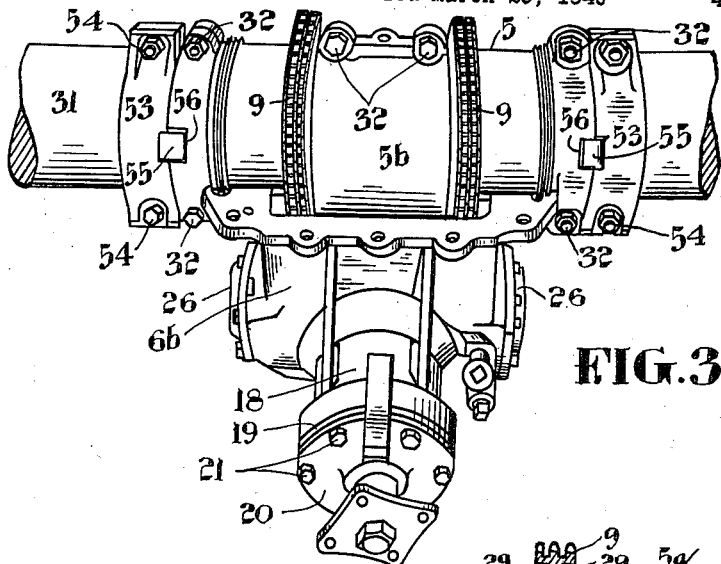
Fig. 3 is a view showing the assembly as it appears with the upper half of the casing removed.

In the present drawings, my invention is shown embodied in a generator driving assembly of the type comprising an axle driven sleeve 5, a transmission casing 6 rotatably mounted on bearings provided at the ends of said sleeve, a jack shaft 7 journalled in said casing, and drive chains 8 connecting chain sprockets 9 on the sleeve 5 with similar sprockets 10 on the jack shaft 7 which drives a tail shaft 12 extending into said casing.

The mounting of the jack shaft 7 and the tail shaft 12 as well as the arrangement of the gearing provided between these two shafts may be the same as described in said patent. In the present instance (see Fig. 2) tail shaft 12 extends through a sleeve 16 in which it is rotatably mounted by suitable antifriction means 17 which may be of either the ball or roller bearing type. Sleeve 16 is fitted in the tubular extension or head end 18 of the transmission casing 6. The outer end of sleeve 16 is provided with a flange 19 which bears against the outer end of the tubular extension 18. A cover plate 20 is fitted to the flange 19 and secured in place by cap screws 21. This cover plate is provided with packing glands 22 through which the shaft 12 extends. The inner end of shaft 12 carries a bevel pinion 24 meshing with a bevel pinion 25 fixed to the jack shaft 7. The ends of the jack shaft 7 are journalled in suitable bearings carried by cap member 26 fastened in openings formed in opposite sides of the casing 6.

Figure 4:
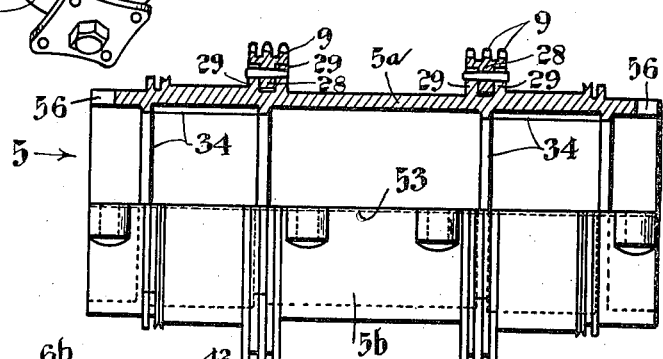
Fig. 4 is a view partly in elevation and partly in vertical section of the axle driven sleeve embodied in my improved transmission assembly. This view also shows a slight modification of the sprockets as compared with the sleeve shown in the preceding figures.
Figure 5:
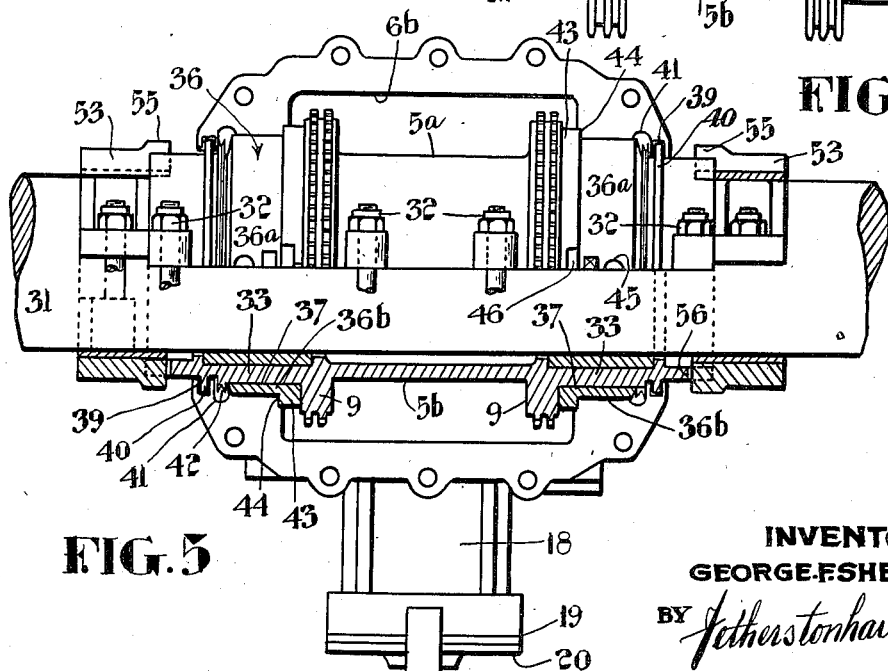
Fig. 5 is a plan view of the transmission assembly with the upper half of the casing removed and with certain elements shown partly in horizontal section.
Figure 7:
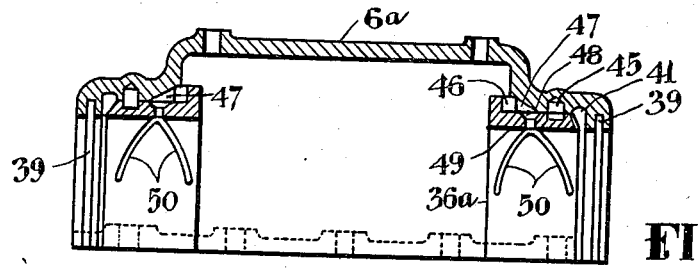
Fig. 7 is a view showing the upper half of the transmission casing in vertical section. This view also shows the manner in which the upper halves of the bearing bushings are fitted in the casing.

The sprockets 9 and 10 carried by the sleeve 5 and the jack shaft 7 may be of the duplex type shown in Fig. 3 or of the triplex type shown in Fig. 4. The sprockets 9 may be formed integral with the sleeve 5 as shown in Fig. 3 or they may be of the replaceable type shown in Fig. 4. In the latter instance each sprocket includes an attaching flange 28 which is fitted between and fastened to flanges 29 formed integral with the sleeve 5. The sprockets 10 carried by the jack shaft 7 may also be removably mounted on said shaft in the same manner as the removable sleeve sprockets shown in Fig. 4. When replaceable sprockets are employed they must, of course, be made in sections so that the flanges 29 of the various sections may be fitted in place and secured to the sleeve flanges 28.

The axle driven sleeve 5 comprises two half sections 5a and 5b which are secured in place about the truck axle 31 by the clamping bolts 32. When the sleeve 5 is clamped in place its inner surface is spaced from the axle 31 by interposed rubber blocks 33. These rubber blocks are placed under heavy compression between the axle and the sleeve when the two halves of the latter are drawn tightly together by the clamping bolts 32. It will also be noted that each rubber block is secured to the inner surface of the sleeve by pressing it into a pocket formed by longitudinal and circumferential ribs 34 welded to said surface. As shown in Fig. 6, the longitudinal ribs 34 of each block receiving pocket are radially disposed with respect to the inner curved surface of the sleeve so that the inner sides of these ribs converge as they approach the central axis of the sleeve. Each rubber block is normally flat and is somewhat larger than the pocket into which it is fitted. The rubber blocks must therefore be forced into the pockets under pressure and, during this operation, are caused to assume the curved shape shown in Fig. 6. Since each block completely fills the pocket in which it is inserted the side edges of the block which press against the inner sides of the longitudinal ribs 34 are also inclined so that they converge toward the central axis of the sleeve. It will therefore be seen that, due to this inclination or convergence of the side edges of the block, it is held in place between the pocket defining ribs 34 by practically a dove-tail fit.

It will also be noted that the rib forming pockets of the sleeve are arranged so that the rubber blocks inserted in said pockets are equally spaced around the axle 31, thus assuring uniform distribution of the load bearing surfaces afforded by said blocks. It will also be noted that the inner or axle engaging surface of each rubber block is interrupted by grooves 35. In practice I have found that the purpose of these grooves is essentially to ensure that the load bearing pressure exerted on the axle by the engaging surfaces of the rubber blocks will be uniform across the width of the blocks.

The transmission casing 6 is rotatably mounted on the sleeve 5 by means of the bearing bushings 36 which are fitted in the end portions of the casing and surround bearing surfaces 37 formed on the outer surface of the sleeve 5 adjacent the outer sides of the sprockets 9. The transmission casing 6 is made in two sections 6a and 6b which are fastened together by the clamping bolts 38. Adjacent their extreme ends the casing sections 6a and 6b are grooved as indicated at 39 to receive collars 40 formed integral with the sleeve 5. Inwardly of the grooves 39 the casing sections 6a and 6b are provided with larger oil returning grooves 41 into which project labyrinths 42 cast integral with the sleeve 5. The oil return grooves 41 are located between the outer ends of the bearing bushings 36 and the casing grooves 39.

Figure 8:
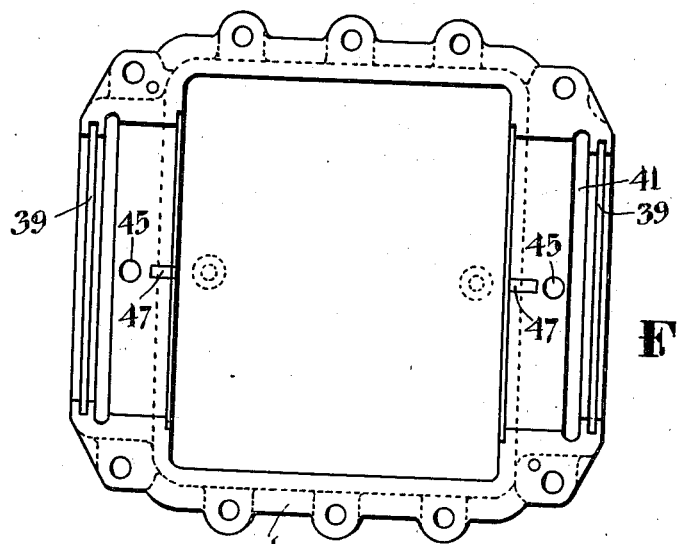
Fig. 8 is a plan view of the casing section shown in Fig. 7.
Figure 9:
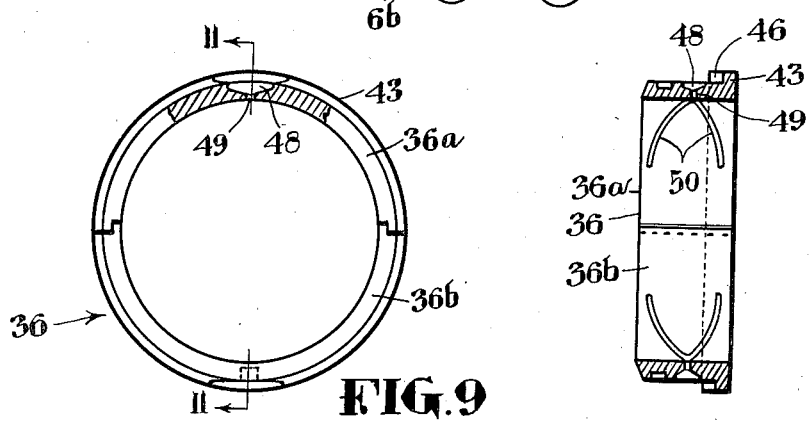
Fig. 9 is a view partly in elevation and partly in section of one of the bearing bushings interposed between the casing and the axle driven sleeve.
Figure 11:
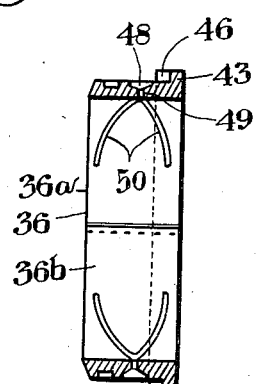
Fig. 11 is a vertical sectional view taken along the line 11—11 of Fig. 9.
Figure 10:
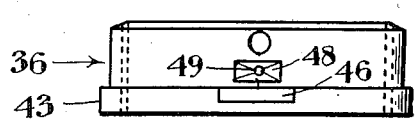
Fig. 10 is a top plan view of the bushing appearing in Fig. 9.
Figure 12:
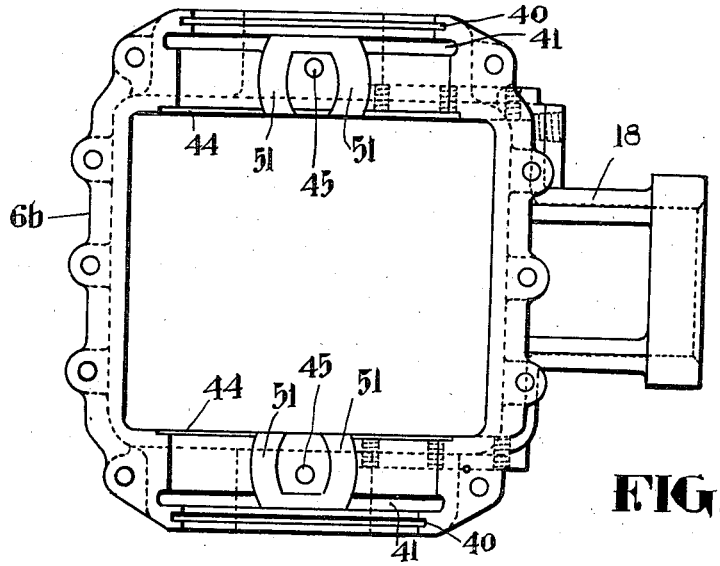
Fig. 12 is a plan view of the lower half section of the transmission casing.
Figure 13:
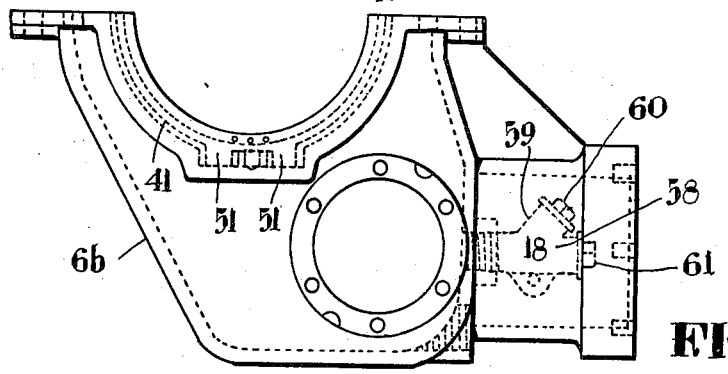
Fig. 13 is a side view of the casing section shown in Fig. 12.
Figure 14:
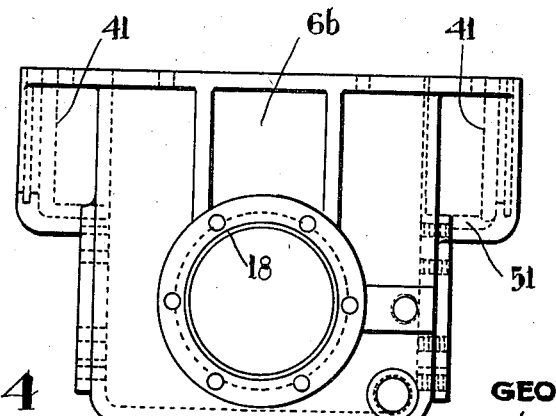
Fig. 14 is an end view of the casing section shown in Fig. 12.

Each bushing 36 is provided at its inner end with a collar 43 which fits into the casing recess 44. Each bushing is also made in two sections comprising an upper section 36a fitted in casing section 6a and a lower section 36b fitted in casing section 6b. The upper section 36a of each bushing 36 is provided with a collar recess 46 which serves, in conjunction with a registering recess 47 (Fig. 8) formed in the upper half 6a of casing 6 to provide an oil passage through which oil passes from the upper portion of the casing to a well 48 formed in the outer circumferential surface of the bushing section. The oil delivered to well 48 passes through an opening 49 to diverging circumferentially extending grooves 50 formed in the inner surface of bushing section 36a. The oil distributed through the grooves 50 forms a lubricating film between the inner surface of bearing bushing 36 and the opposing bearing surface 37 of sleeve 5 and is gradually forced across these bearing surfaces in the direction of the adjacent oil return groove 41 which returns the oil to the bottom of the transmission casing by way of the communicating passages 51 provided in the lower half 6b of the casing. Each of bearing bushing sections 36a and 36b is secured to the portion of the casing in which it is fitted by means of a dowel pin 45. In the present instance I have shown both half sections of each bushing provided with collar recesses 46, oil wells 48, openings 49, and grooves 50 but this is simply to enable the two half sections of each bushing to be used interchangeably at the top and bottom portions of the casing. When the transmission mechanism is in operation the oil well distributing elements 46, 47, 48 and 50 of the lower half of the bushing are not in use since all the oil necessary to lubricate the bearing surfaces of the bushing and sleeve is distributed to these surfaces through the oil distributing passages of the upper section of the bushing.

Driving collars 53 are clamped to the axle 31 at opposite ends of the sleeve 5. Each collar comprises two sections bolted together as indicated at 54 and is formed with driving dogs 55 which extend into driving recesses 56 provided in the ends of the sleeve 5.

The casing 6 is filled, to the lexel X, with oil introduced through a horizontal oil supply fitting 58. The horizontal fitting 58 is provided with a vertically inclined filling neck 59 which is closed by a removable plug 60. The outer end of the horizontal portion of fitting 58 is closed by a removable drain plug 61. The plug 61 is removed to check the level of the oil in the transmission casing. If the oil is at the proper level it will drain through the fitting 58 when the plug 61 is removed. Lack of drainage through the fitting 58 indicates that the oil level is below the desired level and this should then be remedied by introducing a sufficient quantity of oil through the filling neck 59.

When the transmission assembly is in operation oil is carried to the upper part of the casing by the drive chains 8 and a sufficient quantity of this oil is delivered to the bearing surfaces of the bushings 36 and the sleeve 5 by way of the oil passages 46, 47, 48 and 49 and the grooves 50. As the oil flows across the inner bearing surfaces of the bushing 36 and the opposing sleeve bearing surfaces 37 toward the ends of casing 6 it is collected in the oil return grooves 41 of the upper and lower casing sections and returned to the lower half of the casing by way of the passages 51 provided in the lower casing section.

The opposing edges of the sleeve sections 5a and 5b are provided with V-shaped grooves 5c (Figs. 4 and 6) in which a suitable sealing packing 5d is confined under compression.

Having thus described my invention, what I claim is:

1. An axle driven transmission assembly for railway cars comprising an axle driven sleeve, a transmission casing rotatably mounted on said sleeve by sleeve encircling bushings fixed in openings provided in the side walls of the casing, each bushing being provided between its inner and outer ends with a top opening through which oil is conducted from the outer casing engaging surface to the inner sleeve engaging surface of said bushing, each bushing being also provided, adjacent its inner end, with a groove formed in its outer surface and registering with a groove in the inner portion of the wall of the casing opening in which the bushing is fitted, said registering grooves conjointly providing a passage for conducting oil to said opening from the interior of the casing.

2. An axle driven assembly as set forth in claim 1 in which the wall of each bushing receiving opening of the casing is provided with an oil return groove located at the outer end of the bushing fitting in said opening and an oil return passage leading inwardly from said groove to the interior of the casing, said return passage being positioned below said bushing.

3. An axle driven transmission assembly for railway cars comprising an axle driven sleeve, a transmission casing rotatably mounted on said sleeve by sleeve engaging bearing bushings fitted in openings provided in the side walls of the casing, each bushing and the wall of the opening in which it is fitted being provided with mating grooves affording an oil passage through which oil is conducted from the interior of the casing to the outer or casing engaging surface of the bushing, each bushing being further provided with an opening extending from its outer to its inner surface, the outer end of said opening communicating with said oil conducting passage and the inner end communicating with oil distributing grooves formed in the inner surface of the bushing, said assembly being further characterized in that the wall of each bushing receiving opening is provided with an oil collecting groove surrounding the outer end of the adjacent bushing and with an oil return passage leading from said oil collecting groove to the interior of said casing, said oil return passage being positioned below said bushing.

4. A transmission assembly as set forth in claim 3 in which the wall of each bushing receiving opening of the casing is provided with an inwardly facing rib receiving groove located outwardly of said oil collecting groove and in which the sleeve is provided with an outwardly directed rib extending into said rib receiving groove.

5. A transmission assembly as set forth in claim 3 in which the sleeve is provided with labyrinth forming portions projecting into said oil collecting grooves.

6. A transmission assembly comprising an axle driven sleeve, a transmission casing rotatably mounted on said sleeve by bushings secured in openings provided in the side walls of said casing, each of said bushings being provided at its inner end with an outwardly directed flange fitted in a recess provided in the casing wall at the inner end of the bushing receiving opening, said flange being provided with a groove forming with an opposing groove in the casing wall an oil conducting passage through which oil is conducted from the interior of the casing to the outer annular surface of the bushing, said bushing being further provided with an opening extending from its outer to its inner annular surface, the outer end of said opening communicating with said oil conducting passage and the inner end of said opening communicating with oil distributing grooves provided in the inner annular surface of the bushing, said assembly being further characterized in that the wall of each bushing receiving opening is provided with an oil returning groove surrounding the outer end of the bushing fitted in said opening and with an oil returning passage leading from said oil returning groove to the interior of the casing, said oil returning passage being located below the lowermost portion of the bushing.

GEORGE F. SHEPPARD,